United States Patent
Doetterl

(10) Patent No.: US 9,091,315 B2
(45) Date of Patent: Jul. 28, 2015

(54) UNDULAR WASHER

(75) Inventor: Peter Doetterl, Waldershof (DE)

(73) Assignee: Scherdel Innotec Forschungs—Und Entwicklungs—GmbH, Marktredwitz (DE)

( * ) Notice: Subject to any disclaimer, the term of this patent is extended or adjusted under 35 U.S.C. 154(b) by 112 days.

(21) Appl. No.: 13/983,204

(22) PCT Filed: Feb. 1, 2012

(86) PCT No.: PCT/EP2012/051684
§ 371 (c)(1),
(2), (4) Date: Nov. 6, 2013

(87) PCT Pub. No.: WO2012/104348
PCT Pub. Date: Aug. 9, 2012

(65) Prior Publication Data
US 2014/0048991 A1    Feb. 20, 2014

(30) Foreign Application Priority Data
Feb. 2, 2011 (DE) ..................... 20 2011 002 271 U

(51) Int. Cl.
*F16F 1/34* (2006.01)
*F16F 1/02* (2006.01)
*F16F 1/32* (2006.01)
*B23K 15/00* (2006.01)

(52) U.S. Cl.
CPC ............. *F16F 1/025* (2013.01); *B23K 15/0006* (2013.01); *F16F 1/328* (2013.01); *F16F 2226/048* (2013.01); *Y10T 29/49609* (2015.01)

(58) Field of Classification Search
CPC ............ F16F 1/025; F16F 1/32; F16F 1/328; F16F 2226/048
See application file for complete search history.

(56) References Cited

U.S. PATENT DOCUMENTS

| 5,833,776 | A | * | 11/1998 | Labesky ........................ 148/580 |
| 2007/0183867 | A1 | * | 8/2007 | Hesselmann et al. ......... 411/544 |
| 2011/0006467 | A1 | * | 1/2011 | Mizuno et al. ................ 267/161 |

FOREIGN PATENT DOCUMENTS

| EP | 1245306 | | 10/2002 |
| JP | 50059262 | U  * | 10/1973 |
| JP | 8135706 | | 5/1996 |

OTHER PUBLICATIONS

JP38135706 English Language Translation of Abstract.

* cited by examiner

*Primary Examiner* — Anna Momper
(74) *Attorney, Agent, or Firm* — Ware, Fressola, Maguire & Barber LLP

(57) ABSTRACT

The invention relates to a wave spring (2) which comprises a spring strip (4) which is coiled in a substantially circular-ring-shaped manner and, over the circumference, describes a wavy line which oscillates about a radial reference plane and has wave crests (6) and wave troughs. The ends of the circular-ring-shaped spring strip (4) are connected by means of a weld seam (10) which is arranged in a low-tension region of the wavy line of the spring strip (4) between a wave crest (6) and an adjacent wave trough (8).

20 Claims, 2 Drawing Sheets

UNDULAR WASHER

This application relates to a wave spring.

Wave springs are used in various ways as axial compensating elements or reset elements. To this end, wave springs are used both as individual elements and in packages together with a plurality of wave springs, for example in coupling arrangements.

Known wave springs are often manufactured by punching them out of a spring strip. For this purpose, a spring washer is, in a first step, punched out of a rolled primary material and then, in a further step, shaped into a wave spring. Circular punch-outs produce much waste material and therefore greater expenses for material and logistics. Moreover, such punched-out wave springs often have disadvantageous punching edges, and removing these requires the additional production step of slide grinding. Furthermore, the spring characteristic of such punched-out wave springs turned out to be insufficient for some applications, in particular for applications exposing the wave spring to dynamic stress.

The problem addressed by the present invention is to provide a reliable and economically producible wave spring that is also well suited for applications exposing the wave spring to dynamic stress.

This problem is solved by providing a wave spring comprising the features of independent claim 1. Advantageous embodiments of a wave spring according to the invention can be gathered from the dependent patent claims.

A wave spring according to the invention substantially comprises a spring strip which is coiled in a substantially circular-ring-shaped manner and, over the circumference, describes a wavy line which oscillates about a radial reference plane and has wave crests and wave troughs. The ends of the circular-ring-shaped spring strip are connected by means of a weld seam, which is arranged in a low-tension region of the wavy line of the spring strip between a wave crest and an adjacent wave trough.

The wave crests on the upper side of the wave spring and the wave troughs on the underside of the wave spring are often used as bearing faces for attachment parts attached to the wave spring, via which an axial force is transmitted into the wave spring.

The inventors of the subject matter of the present application have now found that in a wave spring, the regions of maximum tension are those at the wave crests and at the wave troughs of the wave spring, whereas the regions between a wave crest and an adjacent wave trough are subjected to less stress than the wave crests and wave troughs. When a wave spring is subjected to stress, an axial force is transmitted into the wave spring via the upper and the lower bearing faces of the wave spring. The axial force acting upon the wave troughs acts opposingly to the force acting upon the wave crests of the spring strip. At one point between a wave crest and an adjacent wave trough, the axially opposing forces cancel each other out, thus creating a low-tension region in the spring strip.

The wave spring according to the invention is not manufactured by punching, but by being wound from a spring strip, which is a more economical alternative, as it neither produces any waste material nor requires the subsequent production step of removing the disadvantageous punching edges by slide grinding. Moreover, winding the wave spring from a spring strip yields a very favorable fiber orientation in the circumferential direction of the spring strip, which leads to a very good spring characteristic and to optimal and uniform force distribution over the wave spring and optimal and uniform force transmission into the wave spring, making the wave spring according to the invention particularly suitable for exposure to dynamic stress. It prevents local tension differences within the wave spring and thus prolongs the durability of the wave spring. Furthermore, a fiber orientation extending in the circumferential direction of the spring strip yields, at the spring strip ends, cut edges that extend at an oblique angle or right angle with respect to the fiber orientation. Such a fiber orientation is optimal for welding the spring strip ends together, as the forces are evenly transmitted into the weld seam this way. Furthermore, the tensions at the wave crests and the wave troughs caused by the deformation of the spring strip occurring in these places are in this case lower than in a spring strip in which the fiber orientation is unevenly distributed over the spring strip.

From a production-oriented point of view, it is advantageous to place the weld seam at a wave crest or at a wave trough of the wave spring. However, the inventors have found that weld seams arranged in such a manner are exposed to high dynamic stress and to friction caused by attached parts, which often leads to rapid wear and breaking of the weld seam.

With this in mind, the inventors have found that a coiled wave spring, the ends of which are located in a low-tension region of the wavy line of the spring strip between a wave crest and an adjacent wave trough and are connected to one another by means of a weld seam positioned at this place, has considerably longer durability and reliability, even though such a wave spring is, from a production-oriented view, more difficult to manufacture.

A weld seam placed between a wave crest and an adjacent wave trough is exposed to considerably less stress, because, as the inventors have found, this is a low-tension region and does not come into contact with attachment parts, and thus wear and tear caused by friction can be reliably avoided. This also makes it possible to considerably reduce the wear occurring at the respective attached attachment parts, which would be caused, for example, by a welding bead. In addition, this achieves, over the circumference of the wave spring, a uniform wave height, which is not affected by a welding bead. Moreover, additional tensions within the wave spring, which would be caused by a welding bead located at a wave crest or at a wave trough, can be reliably avoided.

Furthermore, placing a weld seam between a wave crest and an adjacent wave trough of the wave spring also results in even bearing faces on the upper side and the underside of the wave spring, which achieves a particularly even force transmission from a component into the wave spring. This makes it possible to counteract an asymmetrical behavior of the wave spring, which might be caused by an uneven bearing face. In addition, the spring characteristic of the wave spring is this way hardly affected by the weld seam. In the region of the weld seam, the original minimum tensile strength of the spring strip drops to the basic strength of the material, which, with the arrangement of the weld seam in a low-tension region of the wave spring, has no or only very little effect on the spring characteristic.

When manufacturing the wave spring according to the invention, the spring strip is cut in the low-tension region of the spring strip between a wave crest and an adjacent wave trough. Consequently, the cut surfaces often do not extend in a right angle with respect to the fiber direction—which is generally considered especially favorable for welding—, but rather obliquely with respect to the fiber direction—which is more demanding with regard to welding.

The spring stiffness of the wave spring can be modified by the respective number of wave crests and wave troughs of the wave spring. A large number of wave crests and wave troughs results in a high spring stiffness, with the spring characteristic having a high gradient.

Another option for modifying the spring characteristic of the wave spring is by forming the wave spring with wave crests and wave troughs having different amplitudes. Such a wave spring has an increasingly progressive spring characteristic which can be influenced by the height and the number of the individual wave crests and wave troughs.

According to a first embodiment of the invention, the circular-ring-shaped spring strip extends in a wavy line which oscillates, in particular substantially sinusoidally, about the radial reference plane. The weld seam is located in a zero crossing of the wavy line in a region of the radial reference plane.

If the spring strip extends in a wavy line that sinusoidally oscillates about the radial reference plane of the spring strip, the respective wave crests and wave troughs have a uniform height, thereby forming even bearing faces for attachment parts attached to the underside and the upper side of the wave spring.

In cases of an evenly extending, sinusoidal wavy line, the low-tension region is located in the middle between a wave crest and an adjacent wave trough of the spring strip. The lowest-tension region is located in a zero crossing of the wavy line and, by arranging the weld seam in a zero crossing of the wavy line in the region of the radial reference plane, the forces acting upon the weld seam can be minimized. This achieves an optimal spring characteristic and reduces the tension-caused wear on the weld seam of the spring strip to a minimum.

In a further embodiment of the invention, the spring strip is a flat wire.

If the spring strip is a flat wire, the spring strip has a rectangular cross-section. The spring strip is preferably coiled in a circular-ring-shaped manner about the narrower side of the cross-section. The use of a flat wire offers the advantage of forming flat radial bearing faces on the underside and the upper side of the wave spring, thereby ensuring an even force transmission into the wave spring in the axial direction and preventing attachment parts attached to the upper side or the underside of the wave spring from shifting.

It is also conceivable to coil the spring strip in a circular-ring-shaped manner over the longer side of the rectangular cross-section, thereby increasing the spring stiffness of the wave spring.

Furthermore, the use of a flat wire allows for using a rolled spring wire, which is subsequently coiled in a circular-ring-shaped manner. A coiled spring wire provides a uniform fiber direction in the circumferential direction of the circularly coiled wave spring and thus provides an even force distribution within the spring strip.

In further embodiments of the wave spring according to the invention, the spring strip has a round, oval or ellipsoid cross-section.

Furthermore, other cross-sectional shapes of the spring wire are also conceivable. The cross-sectional shape of the spring strip affects the spring stiffness of the wave spring on the one hand and the tension distribution within the spring strip on the other hand. A symmetrical cross-section of the spring strip provides an even tension distribution within the spring strip.

According to a further embodiment of the invention, the spring strip is made of a spring-hard, stainless material having a small carbon proportion.

The use of such a material prevents the formation of new hardening zones at the weld seam of the spring strip. New hardening zones represent an embrittlement of the weld seam, which reduces the strength of the weld seam, leading to wear or even to failure of the weld seam. The formation of new hardening zones in the weld seam is reliably avoided by using a spring strip material having a small carbon proportion.

According to a further embodiment of the invention, the weld seam is a laser weld seam.

A laser weld seam offers the advantage that, compared to other welding methods, a low, concentrated amount of energy is transmitted into the wave spring, thereby preventing a thermally induced distortion of the wave spring. Furthermore, laser welding allows for welding from a great distance and reaching places that are difficult to access. Laser welding makes it possible to work on the regions between the wave crests and wave troughs, which are, compared to the wave crests and wave troughs of the spring strip of the wave spring, more difficult to access. Another advantage of laser welding is that any seam geometries can be produced in the material. Furthermore, a welded seam can be subsequently refined, for example by grinding the welding bead, in order to get an even spring strip surface.

According to a further embodiment of the invention, the weld seam does not comprise any material that is introduced in addition to the material of the spring strip.

If the welding process does not require any material that is introduced in addition to the material of the spring strip, the two ends of the spring strip can be directly welded together, thereby achieving an optimal connection between the two spring ends. To this end, it is necessary that the two spring ends are arranged with none or only a very small distance therebetween in order to have sufficient spring strip material available to form a weld seam.

Furthermore, it is also conceivable that the weld seam comprises material that is introduced in addition to the material of the spring strip, which makes it possible to weld together spring strip ends that, due to the production process, are further spaced apart from one another to form a ring-shaped wave spring. In this process, preferably a material which is the same as or similar to the material of the spring strip is additionally introduced into the weld seam. If a material that is different from the spring strip material is chosen, it should preferably have a small carbon proportion to ensure the strength of the weld seam and to prevent cracking or embrittlement in the weld seam.

Another embodiment of the invention comprises a spring strip having at least two wave crests and two wave troughs.

The provision of an even bearing face on the upper side and on the underside of the wave spring requires the spring strip to have at least two wave crests and two wave troughs. This also ensures an even force transmission into the wave spring in an axial direction.

In addition, the invention contains a method for manufacturing a wave spring, comprising the following steps: winding a spring wire in a substantially circular-ring-shaped manner, wherein the fiber orientation of the spring strip material extends in a circumferential direction of the spring strip; forming the spring strip, over the circumference thereof, in a wavy line that oscillates about a radial reference plane; cutting the spring strip; and connecting the ends of the spring strip by means of a weld seam, wherein the weld seam is placed in a low-tension region of the wavy line of the spring strip between a wave crest and an adjacent wave trough.

Such a method can be carried out relatively quickly and economically. It neither produces waste material nor requires an additional step of removing punching burrs.

A wave spring manufactured by means of such a method realizes the advantages described above; all embodiments and the thus resulting advantages described with reference to the wave spring correspondingly apply to the manufacture method thereof.

In one embodiment of the method, the spring strip is formed in a wavy line, which oscillates, particularly substantially sinusoidally, about the radial reference plane, and the weld seam is placed in a zero crossing of the wavy line in the region of the radial reference plane.

In a further embodiment, the weld seam is produced by means of laser welding.

In the following, the invention is explained in greater detail by means of several embodiments with reference to the accompanying figures.

FIG. 1 shows a perspective schematic view of a circular-ring-shaped wave spring 2.

The spring strip 4 of the wave spring 2 extends in a wavy line which has wave crests 6 and wave troughs 8 and oscillates, over the circumference of the wave spring 2, about a radial reference plane. In the embodiment shown in FIG. 1, the spring strip 4 comprises altogether eight wave crests 6 and eight wave troughs 8.

Figure 1:
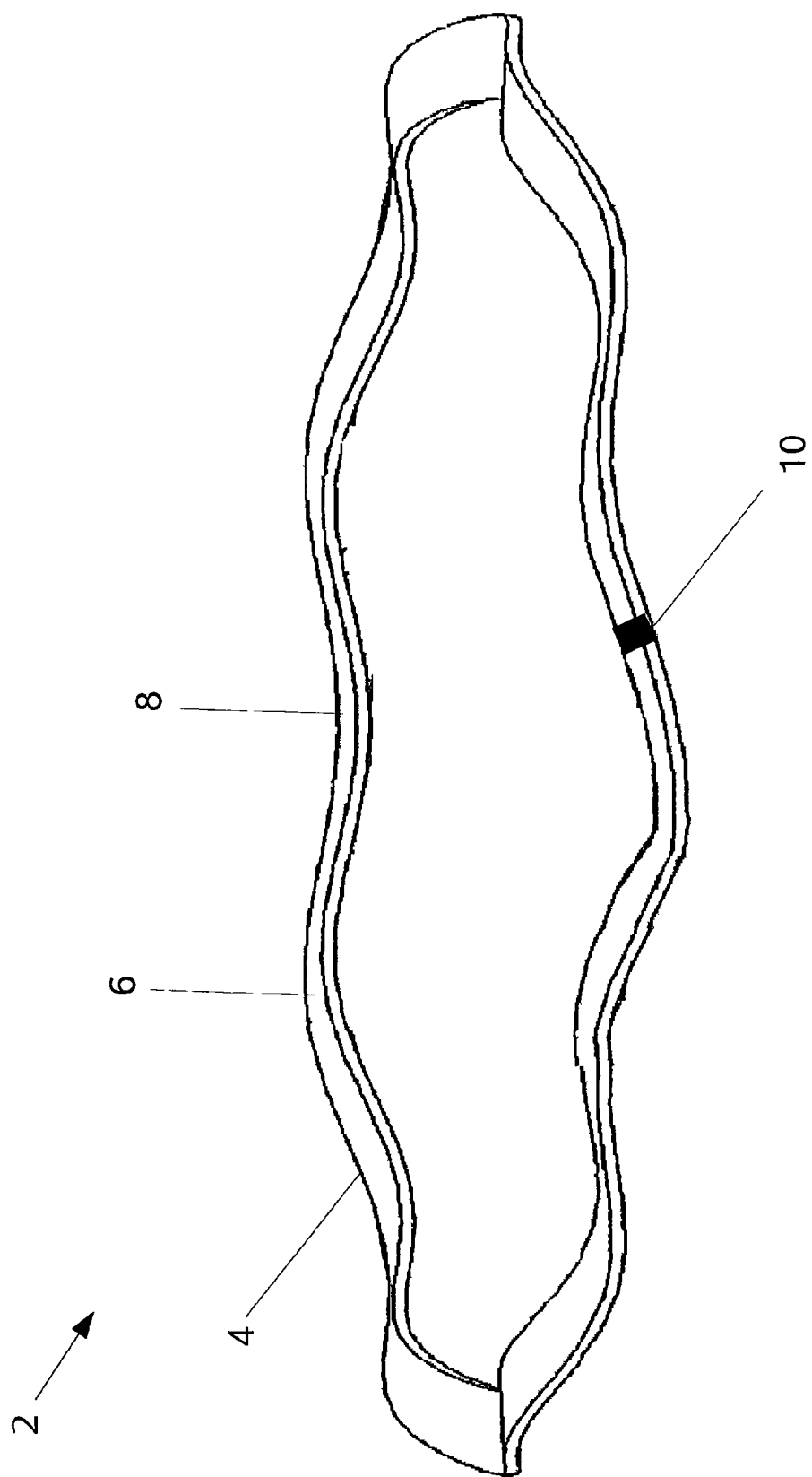
FIG. 1 shows a perspective schematic view of a wave spring according to an embodiment of the invention.

In the embodiment shown in FIG. 1, the spring strip 4 is a flat wire having a rectangular cross-section. The spring strip 4 is in this case coiled in a circular-ring-shaped manner about the narrower side of the rectangular cross-section.

The wavy line of the spring strip 4 shown in FIG. 1 has a substantially sinusoidal shape, with the wave crests 6 and the wave troughs 8 each having the same height and oscillating about the same radial reference plane. Since the wave crests and wave troughs have the same height, a flat bearing face on the upper side and the underside of the wave spring 2 is achieved.

Furthermore, FIG. 1 shows a schematically represented weld seam 10, illustrated in the front region of the wave spring 2, which connects the two ends of the wave spring 2 at a zero crossing of the sinusoidal wavy line of the spring strip 4 between a wave crest 6 and an adjacent wave trough 8 to form a closed, circular ring. In the embodiment of FIG. 1, the weld seam 10 is positioned within the radial reference plane, about which the spring strip 4 of the wave spring oscillates.

According to the inventors' finding, the regions subjected to maximum tension are those at the wave crests 6 and at the wave troughs 8 of the spring strip 4. This is because the wave crests 6 and the wave troughs 8 form bearing faces for attachment parts to be attached to the wave spring 2, via which axial forces are transmitted into the wave spring 2. In a wave spring subjected to stress, the axially acting forces transmitted into the spring strip 4 via the wave crests 6 act opposingly to the axially acting forces acting upon the wave troughs 8. The regions between two adjacent wave troughs 8 and wave crests 6 are low-tension regions, which are subjected to less stress.

Placing the weld seam 10 in such a low-tension region of the wave spring 2, as shown in FIG. 1, therefore offers the advantage that the weld seam is subjected to less tension than when placed at a wave crest 6 or at a wave trough 8. This achieves less wear and a very high durability and reliability of the weld seam 10.

Furthermore, a weld seam 10 between a wave crest 6 and an adjacent wave trough 8 does not cause any wear that would be caused by friction between the weld seam 10 and an attachment part attached to the upper side or underside of the wave spring 2. This also contributes to the long durability of the weld seam 10. The weld seam 10 shown in FIG. 1 does not come into contact with an attachment part attached to the upper side or the underside of the wave spring 2.

A weld seam 10 that is positioned between a wave crest 6 and an adjacent wave trough 8 only insignificantly modifies the spring characteristic of the wave spring 2. In the region of the weld seam 10, the minimum tensile strength drops to the basic strength of the material of the spring strip 4, which, due to the arrangement of the weld seam 10 in a low-tension or tension-free region of the wave spring 2, has only very little effect on the spring stiffness of the wave spring 2.

The use of a flat wire having a rectangular cross-section as a spring strip 4 provides a flat radial bearing face on the upper side and the underside of the wave spring, thereby achieving an even force transmission in an axial direction and preventing attachment parts attached to the bearing faces of the wave spring 2 from shifting.

The spring strip 4 shown in FIG. 1 is in particular a rolled spring wire, which is subsequently coiled in a circular-ring-shaped manner. A coiled spring wire has, in contrast to a punched spring wire, a uniform fiber direction in the circumferential direction of the circularly coiled spring strip 4. This achieves an even force distribution within the spring strip 4. Thanks to the uniform fiber direction, a rolled and subsequently coiled spring material is better suited for a dynamic application of the wave spring 2.

Furthermore, a rolled spring strip 4, in contrast to a punched spring strip, does not have punch burrs, and the edges of the spring strip 4 extend evenly. Therefore, deburring the edges is also not necessary.

Furthermore, a coiled spring strip 4 is, in contrast to a punched wave spring, more economical, as it does not, compared to punched parts, for example, produce any waste material, which saves up to 95% of material.

In the manufacturing process, first an open circular-ring-shaped wave spring is wound from a spring strip 4, the ends of which are then connected by a weld seam 10.

The number of the illustrated wave crests 6 and wave troughs 8 of the wave spring 2 is only exemplary; it is, of course, possible to provide an arbitrary number of wave crests 6 and wave troughs 8, said number affecting the spring stiffness of the wave spring 2. A higher number of wave crests 6 and wave troughs 8 would, for example, increase the spring stiffness of the wave spring 2 when stressed in an axial direction and would make the spring characteristic rise more steeply.

Furthermore, it is conceivable to form wave crests 6 and wave troughs 8 with different heights on the spring strip 4. By doing so, the spring characteristic can be individually modified and exhibits an increasingly progressive gradient.

Figure 2:
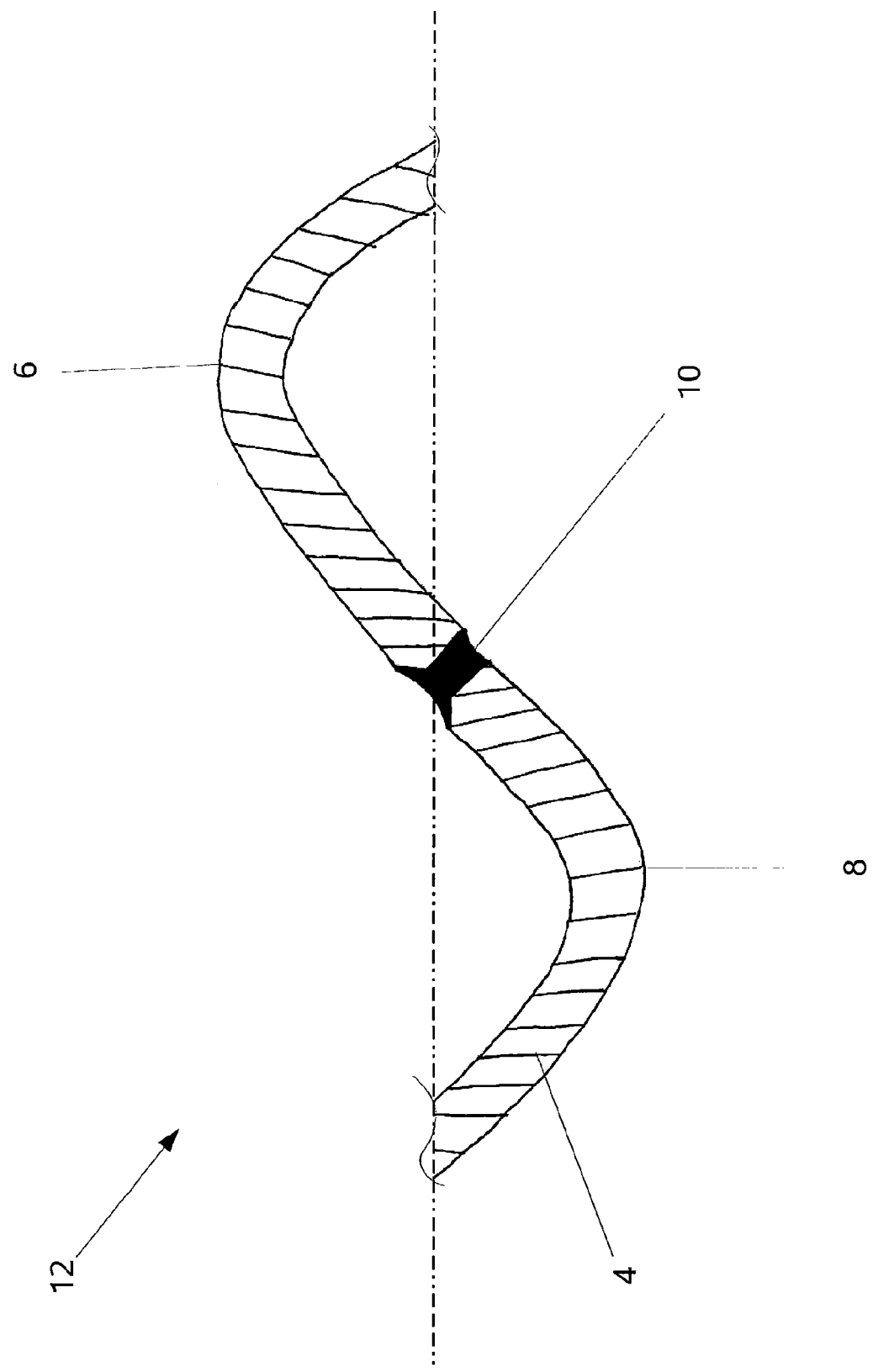
FIG. 2 shows a schematic sectional view of an enlarged section of the wave spring from FIG. 1.

FIG. 2 shows a schematic sectional view of an enlarged section 12 of the wave spring 2.

Section 12 of the wave spring shows a period of the sinusoidal wavy line of the spring strip 4 and, illustrated in an interrupted manner, the radial reference plane. From left to right, the illustrated wave spring section 12 starts at a zero crossing of the sinusoidal wavy line through the radial reference plane, then delineates a wave trough 8, then rises to cross zero again to then form a wave crest 6 and then ends at a zero crossing of the sine wave again.

The ends of the spring strip 4, where the circular-ring-shaped spring strip was cut off after the winding process, are located between the wave trough 8 and the wave crest 6 in the low-tension zero crossing through the radial reference plane of the spring strip 4. These ends of the spring strip 4 are connected by means of a weld seam 10. The fiber direction of the spring strip 4 follows the course of the spring strip 4. The weld seam 10 extends vertically thereto, with the main direction of extension of the weld seam 10 forming an angle of 40 to 50° with respect to the radial reference plane. By arranging the weld seam 10 in the low-tension zero crossing through the radial reference plane of the spring strip 4, the forces acting upon the weld seam 10 can be kept low.

The weld seam 10 was in particular produced by means of a laser welding method. The use of laser welding can achieve different seam geometries. An advantage of laser welding is that, compared to other welding methods, a low and concentrated amount of energy is transmitted into the spring strip 4, thereby preventing a thermally induced deformation of the spring strip 4. Furthermore, laser welding allows for welding from a relatively large distance and allows working on regions of the wave spring 2 that are difficult to access, such as the regions between a wave crest 6 and an adjacent wave trough 8.

The weld seam 10 extends from the underside of the spring strip 4 to the upper side thereof and has, both on its underside and upper side, a recess, which renders the material strength of the weld seam 10 in this region slightly lower than the material strength of the spring strip 4. The upper side of the weld seam 10 is considerably wider and the underside of the weld seam 10 a little wider than the region therebetween, which is of a constant width and extends over approximately two thirds of the thickness of the spring strip 4.

The weld seam 10 shown in FIG. 2 was produced by laser welding without using any additional welding material, so that the ends of the spring strip 4 were directly welded to one another. Alternately, it is of course possible to produce the weld seam 10 by introducing additional material in addition to the material of the spring strip 4. This would be, in particular, to connect spring strip ends which are farther spaced apart from one another due to production reasons, such that this distance must be bridged by additional material. To achieve an optimal connection between the spring strip material and the additional material, a material is, in particular, used that is similar to or the same as the material of the spring strip 4. The additionally used material preferably has a small carbon proportion in order to prevent the formation of cracks in the weld seam 10.

The spring strip 4 of the wave spring 2 shown in FIGS. 1 and 2 comprises a spring-hard, stainless material, a spring steel having a small carbon proportion. This prevents the formation of new hardening zones that involve the embrittlement of the weld seam and therefore are of a lower strength.

A wave spring 2 is suitable for a variety of applications. A preferential application is in coupling arrangements, wherein the individual coupling plates are arranged spaced apart from one another in an axial direction by wave springs 2 arranged therebetween. Such a wave spring 2 is exposed to dynamic use and the weld seam arrangement according to the invention has proved to be particularly advantageous for this application.

LIST OF REFERENCE SIGNS 2 wave spring
4 spring strip
6 wave crest
8 wave trough
10 weld seam
12 section of wave spring

I claim:

1. Wave spring (2) comprising:
    a spring strip (4) which is coiled in a substantially circular-ring-shaped manner and, over the circumference, describes a wavy line which oscillates substantially sinusoidally, about a radial reference plane and has wave crests (6) and wave troughs, wherein ends of the circular-ring-shaped spring strip (4) are connected by a weld seam (10) which is arranged in a low-tension region of the wavy line of the spring strip (4) between a wave crest (6) and an adjacent wave trough (8) in a zero crossing of the wavy line in the region of the radial reference plane.

2. Wave spring (2) according to claim 1, wherein the spring strip (4) is a flat wire.

3. Wave spring (2) according to claim 2, wherein the spring strip (4) comprises a spring-hard, stainless material.

4. Wave spring (2) according to claim 2, wherein the weld seam (10) is a laser weld seam.

5. Wave spring (2) according to claim 2, wherein the weld seam (10) does not comprise any material that is introduced in addition to the material of the spring strip (4).

6. Wave spring (2) according to claim 2, wherein the weld seam (10) comprises material that is introduced in addition to the spring strip (4).

7. Wave spring (2) according to claim 2, wherein the spring strip (4) comprises at least two wave crests (6) and two wave troughs.

8. Wave spring (2) according to claim 1, wherein the spring strip (4) has a round cross-section.

9. Wave spring (2) according to claim 8, wherein the spring strip (4) comprises a spring-hard, stainless material.

10. Wave spring (2) according to claim 8, wherein the weld seam (10) is a laser weld seam.

11. Wave spring (2) according to claim 8, wherein the weld seam (10) does not comprise any material that is introduced in addition to the material of the spring strip (4).

12. Wave spring (2) according to claim 8, wherein the weld seam (10) comprises material that is introduced in addition to the spring strip (4).

13. Wave spring (2) according to claim 8, wherein the spring strip (4) comprises at least two wave crests (6) and two wave troughs.

14. Wave spring (2) according to claim 1, wherein the spring strip (4) comprises a spring-hard, stainless material.

15. Wave spring (2) according to claim 1, wherein the weld seam (10) is a laser weld seam.

16. Wave spring (2) according to claim 1, wherein the weld seam (10) does not comprise any material that is introduced in addition to the material of the spring strip (4).

17. Wave spring (2) according to claim 1, wherein the weld seam (10) comprises material that is introduced in addition to the spring strip (4).

18. Wave spring (2) according to claim 1, wherein the spring strip (4) comprises at least two wave crests (6) and two wave troughs.

19. Method for manufacturing a wave spring (2), comprising the following steps which are carried out consecutively:
    winding a spring strip in a substantially circular-ring-shaped form, wherein the fiber orientation of the material of the spring strip extends in the circumferential direction of the spring strip (4); forming the spring strip (4) in a wavy line, which oscillates substantially sinusoidally, about a radial reference plane and has, over the circumference, wave crests (6) and wave troughs (8) and cutting the spring strip (4), and
    connecting the ends of the spring strip (4) with a weld seam (10), wherein the weld seam (10) is arranged in a low-tension region of the wavy line of the spring strip (4) between a wave crest (6) and an adjacent wave trough (8) in a zero crossing of the wavy line in the region of the radial reference plane.

20. The method according to claim 19, wherein the spring strip (4) has a round cross-section.

* * * * *